United States Patent [19]

Small et al.

[11] Patent Number: 5,391,932
[45] Date of Patent: Feb. 21, 1995

[54] SOURCE POWER COUPLER

[75] Inventors: Kenneth T. Small, Cupertino; G. Michael Hey, Palo Alto; Donald D. Baumann, San Jose, all of Calif.

[73] Assignee: Echelon Corporation, Palo Alto, Calif.

[21] Appl. No.: 94,765

[22] Filed: Jul. 20, 1993

[51] Int. Cl.⁶ .......................................... H04M 11/04
[52] U.S. Cl. ................................ 307/125; 340/310.08; 327/594
[58] Field of Search ................. 307/2, 3, 26, 73, 105, 307/98, 99, 125, 296.6, 296.8, 310; 340/310 CP, 310 A, 310 R; 323/265, 273, 275, 277; 361/84

[56] References Cited

U.S. PATENT DOCUMENTS

| | | | |
|---|---|---|---|
| 4,016,480 | 4/1977 | Hofmann | 340/310 R |
| 4,573,041 | 2/1986 | Kitagawa et al. | 340/310 A |
| 4,697,166 | 9/1987 | Warnagiris et al. | 340/310 CP |
| 4,885,563 | 12/1989 | Johnson et al. | 340/310 A |
| 4,969,147 | 11/1990 | Markkula | 370/94 |
| 5,016,157 | 5/1991 | Rozman et al. | 307/105 |
| 5,041,763 | 8/1991 | Sullivan et al. | 315/179 |
| 5,153,448 | 10/1992 | Zierhut | 307/2 |
| 5,155,466 | 10/1992 | Go | 340/310 A |
| 5,179,492 | 1/1993 | Kato et al. | 361/84 |
| 5,218,520 | 6/1993 | Rozman et al. | 307/105 |

Primary Examiner—A. D. Pellinen
Assistant Examiner—Peter Ganjoo
Attorney, Agent, or Firm—Blakely, Sokoloff, Taylor & Zafman

[57] ABSTRACT

A transistorized source power coupler for coupling a power source to a pair of transmission lines. DC power from the power source is conducted by the transistorized source power coupler to the transmission lines. Meanwhile, AC signals on the transmission lines are isolated from the power source by the source power coupler. Consequently, the same pair of transmission lines can be used to supply power to cells of a communications system while also conducting data signals between those cells with minimal effect to the power source.

32 Claims, 4 Drawing Sheets

SOURCE POWER COUPLER

FIELD OF THE INVENTION

The present invention pertains to the field of interface devices which are implemented between power sources and communication lines. More specifically, the present invention is related to an apparatus and method of providing isolation at relatively high frequencies while passing direct current power to cells along the communication lines.

BACKGROUND OF THE INVENTION

There are a number of commercially available products which provide sensing; control, and communications in a network environment. These products range from elaborate systems having a large amount of intelligence to simple systems having little intelligence. By way of example, such a system may provide control between a light switch and a light. When the light switch is operated, a digital code pattern is transmitted by one cell and is received by another cell located near the light. When the code is received, it is interpreted and subsequently used to control the light. Such a system, comprising a network of intelligent cells in which the cells communicate, control and sense information, is described in U.S. patent entitled, "Network and Intelligent Cell for Providing Sensing, Bidirectional Communications and Control", U.S. Pat. No. 4,969,147, issued Nov. 6, 1990, which application is assigned to the assignee of the present invention.

The transmitting and receiving of digital data can be performed by a series of transceivers, each of which is connected to an individual cell of a network. These transceivers may communicate with one another in numerous different ways over various media and at many different baud rates. For example, the transceivers could be connected to standard communications lines, such as twisted pair lines, fiber optic cables, and coaxial cables. Indeed, even power lines have been employed as a transmission medium by implementing spread spectrum techniques.

In order to minimize costs, the same transmission lines coupling the various cells can be used to provide a medium for the transmission of data between the cells as well as for supplying power to the cells. In this scheme, duplicate communications lines and power lines are not required. Instead, a single set of transmission lines perform the dual functions of conveying power and data amongst the cells. This optimization can be realized by interposing a source power coupler between the power source and the cells. The source power coupler provides isolation for the relatively high data frequencies while also passing direct current (DC) on transmission lines for powering the cells. In the prior art, source power couplers were typically comprised of a pair of inductors.

FIG. 1 shows a typical prior art source power coupler 101. the source power coupler 101 is comprised of two inductors 102 and 103, which provide the necessary impedance to isolate the power source from the transmission line at data frequencies. Otherwise, the data signals generated by the cells 106–108 will fail to create an adequate voltage across the transmission lines 104 and 105. Data signal levels and transmission reflections can be controlled by means of a parallel, AC coupled termination or damping impedance.

There are numerous problems associated with these prior art source power couplers. Several of the problems are attributable to the flaws inherent to inductors. First, inductors alone do not provide a controllable DC impedance. For certain power supplies (e.g., switching-power supplies), it is desirable to have a controllable DC impedance during power-up of the communications network. This is because the negative resistance resulting from constant cell power and/or the total effective capacitance that must be charged at system power-up might result in the activation of the source power supply's internal protection circuitry. In turn, this might result in a continuous retry to start, a hang-up on the "foldback" curve, or a failure of the source power supply.

Second, inductors alone cannot provide a voltage drop, as might be required, to drop from a common source voltage (e.g., +48 volts) to below a safety limit (e.g., +42.4 volts). Third, dangerous and damaging overvoltage transients are sometimes created during accidental or momentary disruptions in the transmission line circuit. Consequently, additional safeguarding measures are often required. And fourth, short circuits across the transmission lines and from a transmission line to ground, necessitates other safeguarding measures. Simple inductors cannot limit these overcurrent conditions.

Another problem with typical prior art source power couplers is that safety agencies, such as Underwriters Laboratories (UL), may require "single fault tolerance" for protection against overvoltage output situations. Furthermore, as the data rates drop and as DC line currents increase, larger and more expensive coupling devices are required.

Therefore, there is a need in the prior art for a protected source power coupler which provides a constant start-up current at the rated capacity of the system or power source and whose output voltage is limited to fall within safety guidelines. It would be preferable if such a coupler had a delay to allow time for the source power supply to reach full output voltage during system power-up. It would also be preferable if the coupler could preclude power source retry, hang-up, or other failures.

SUMMARY OF THE INVENTION

The present invention pertains to a solid state source power coupler. In the present invention, source power couplers are used in place of inductors. Similar to inductors, the source power couplers' alternating current (AC) impedance increases with frequency.

Furthermore, one or more of the following protection circuits are provided. These protection circuits include a duty cycle dissipation and foldback current limiter for protecting the source power coupler. Also included is a burp current limiter in the source power coupler impedance to protect against damage in case of a short in one of the transmission lines to ground. A reverse voltage circuit is used to protect against accidental line reversal connections. A circuit for controlling the voltage drop is implemented to limit the maximum output voltage to a safe range.

In one embodiment, a constant start-up current at the rated capacity of the system or the power source is provided. Moreover, a delay circuit allows time for the source power supply to reach full output voltage during system power-up. An undervoltage lockout circuit is implemented to preclude power source hang-up by reactivating the power start-up sequence if the input voltage falls below approximately two-thirds of the nominal input voltage. Furthermore, a means for synchronizing the start sequence of multiple source power couplers is provided.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A solid state source power coupler is described. In the following description, for purposes of explanation, numerous specific details are set forth, such as component values, frequencies, voltages, impedances, etc., in order to provide a thorough understanding of the present invention. It will be obvious, however, to one skilled in the art that the present invention may be practiced without these specific details. In other instances, well-known structures and devices are shown in block diagram form in order to avoid unnecessarily obscuring the present invention.

Figure 1:
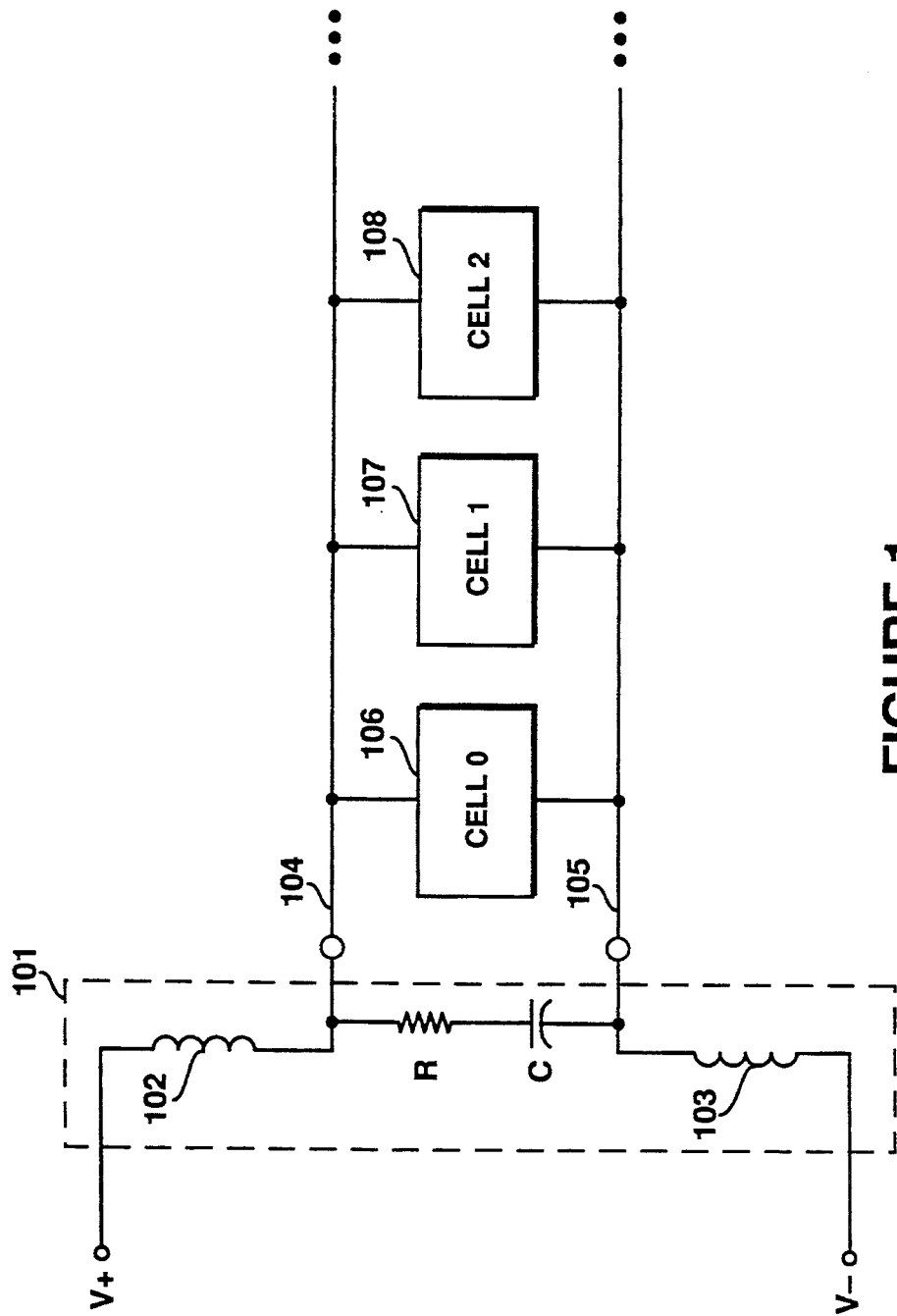
FIG. 1 is a block diagram showing a typical prior art source power coupler for applying DC power to transmission lines.
Figure 2:
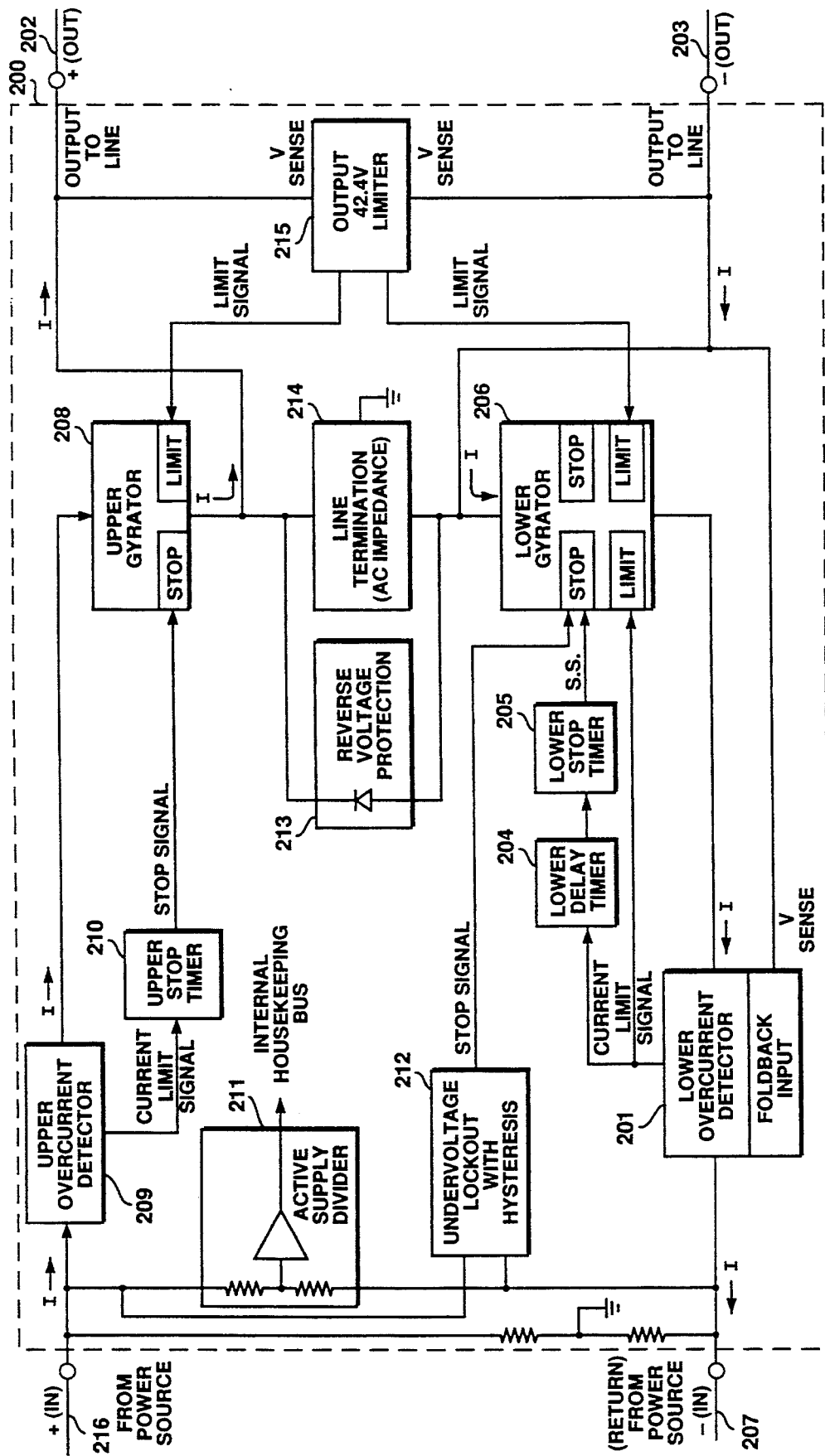
FIG. 2 is a block diagram showing the currently preferred embodiment of the source power coupler of the present invention.

Referring to FIG. 2, a block diagram of the currently preferred embodiment of the present invention is shown. It can be seen that the source power coupler is coupled between the two lines 216 and 207 from the power source and the output lines 202 and 203 to the cells. Line 216 is the positive input from the power source, and line 207 is the negative return from the power source. Lines 202 and 203 are the transmission lines for coupling the cells of the network. Both power and data signals are conducted over lines 202 and 203. The four lines 216, 207, 202, and 203 can include any pair of wires, such as shielded twisted pairs, unshielded twisted pairs, quad pairs, untwisted pairs, and even two coaxial cables.

The source power coupler 200 is comprised of a lower overcurrent detector 201. The lower overcurrent detector 201 is used to prevent excessive output currents during start-up when capacitances on the transmission lines 202 and 203 are being charged. In addition, the lower overcurrent detector 201 prevents excessive output currents whenever an overload or short circuit across the transmission lines 202 and 203 occurs.

Once the overcurrent detector is triggered, the output current is limited until the lower delay timer 204 times out (approximately 0.7 seconds). This provides sufficient time for the capacitors in the cells across the transmission lines 202 and 203 to be charged up. After approximately 0.7 seconds, the lower stop timer 205 is activated. Thereupon, the lower source power isolator 206 is turned off for approximately seven seconds. Hence, this results in a duty cycle of approximately 10%.

In the present invention, the seven second delay occurs each time the source power coupler is powered-up, thereby providing enough time for the power source to reach full output voltage. Consequently, the possibility of accidentally tripping the power source's overcurrent protection mechanism is minimized.

For some applications, such as when the power is derived from a grounded power supply, the grounding of either input line is normal. However, if either output line becomes accidentally grounded with a grounded power supply, then an overcurrent condition may exist. For example, if lines 216 and 202 become grounded, there is no problem with overcurrent. Similarly, if lines 203 and 207 become grounded, there is no problem with overcurrent (except possibly at start-up). However, if lines 216 and 203 accidentally become grounded, then the lower overcurrent protection is triggered. Likewise, if lines 207 and 202 become grounded, the upper overcurrent protection is triggered.

The upper overcurrent detector 209 detects this condition. Upper overcurrent detector 209 is set to detect currents greater than approximately three amperes. Upon detecting currents exceeding three amperes, the upper overcurrent detector generates a current limit signal which is input to the upper stop timer 210. When the upper stop timer receives a current limit signal, it sends a stop signal to the upper source power isolator 208. The stop signal turns off the upper source power isolator 208 in less than 0.001 second and keeps it off for approximately 0.1 second. As a result, a 1% duty cycle is achieved.

The active supply divider 211 is used to provide a voltage for powering the internal op-amps at half of the input voltage. Since the input voltage is +48 volts, the active supply divider 211 provides a +24 volts output onto an internal housekeeping bus. The +24 volts is used to power the semiconductor devices inside the source power coupler.

The undervoltage lockout with hysteresis block 212 prevents the source power coupler from operating when the input voltage is below approximately thirty volts. This insures sufficient voltage on all circuitry during operation. This also prevents loss of control which might damage the source power isolators' transistors by excessive power dissipation. Approximately five volts of hysteresis is provided to insure an abrupt (i.e., clean) snap-on and snap-off of the SPI during power-up and power-down routines. This precludes the possibility of a power source comprised of a linear power supply which utilizes foldback current limiting, from "hanging up" in foldback at the SPI undervoltage lockout point.

The reverse voltage protection block 213 is comprised of a three ampere diode. Its function is to provide reverse voltage protection in case of accidental reversed connections to one of the transmission lines.

The line termination block 214 is used to provide a constant differential termination impedance over the usable signal frequency range. This minimizes signal reflections from the end of an otherwise unterminated transmission line. Furthermore, it also minimizes the distortion of signal waveforms. Moreover, since the signal sources in the cells along the transmission line usually utilize current source outputs, an appropriate damping impedance (e.g., 50 ohms), prevents voltage clipping at the current source outputs from an otherwise unterminated line.

In applications wherein two or more source power couplers are used together for additional power capability, it is important that both source power couplers power-up the transmission line at the same time in order to avoid the possibility of a "hang-up" problem and continuous "burp" shutdowns. A "burp" refers to the activation of a current limiter. The upper source power isolator requires approximately 0.001 seconds to trip and "burp". The lower source power isolator requires approximately 0.7 seconds to trip and "burp". The term "hang-up" refers to a repeating series of "burp" overcurrent shutdowns, such as a failure to startup the communications line power. For example, if the line requires 1.5 amperes and each source power isolator can deliver 1.0 amperes without "burping", then they both must startup at the same time to provide a 2.0 ampere burp-free capability. This requires synchronization.

In the currently preferred embodiment of the present invention, certain safety guidelines are followed. For example, UL 864, 1076, 916, and 508 specify that no more than 42.4 volts DC should be applied across the transmission line under most operating conditions. In addition, this 42.4 volt limit should not be exceeded even with a single point failure (i.e., a single short or open in any single component) in the source power coupler. These safety precautions are provided by the output 42.4 volt limiter block 215. When the output voltage exceeds 42.4 volts, block 215 generates and sends a limit signal to the upper and lower source power isolators 208 and 206. Thereupon, the voltage dropped by the upper and lower source power isolators 208 and 206 is increased to maintain the output voltage below 42.4 volts. Consequently, any component in the source power coupler can be opened or shorted (i.e., a single point failure) without the source power coupler outputting more than 42.4 volts.

Figure 3:
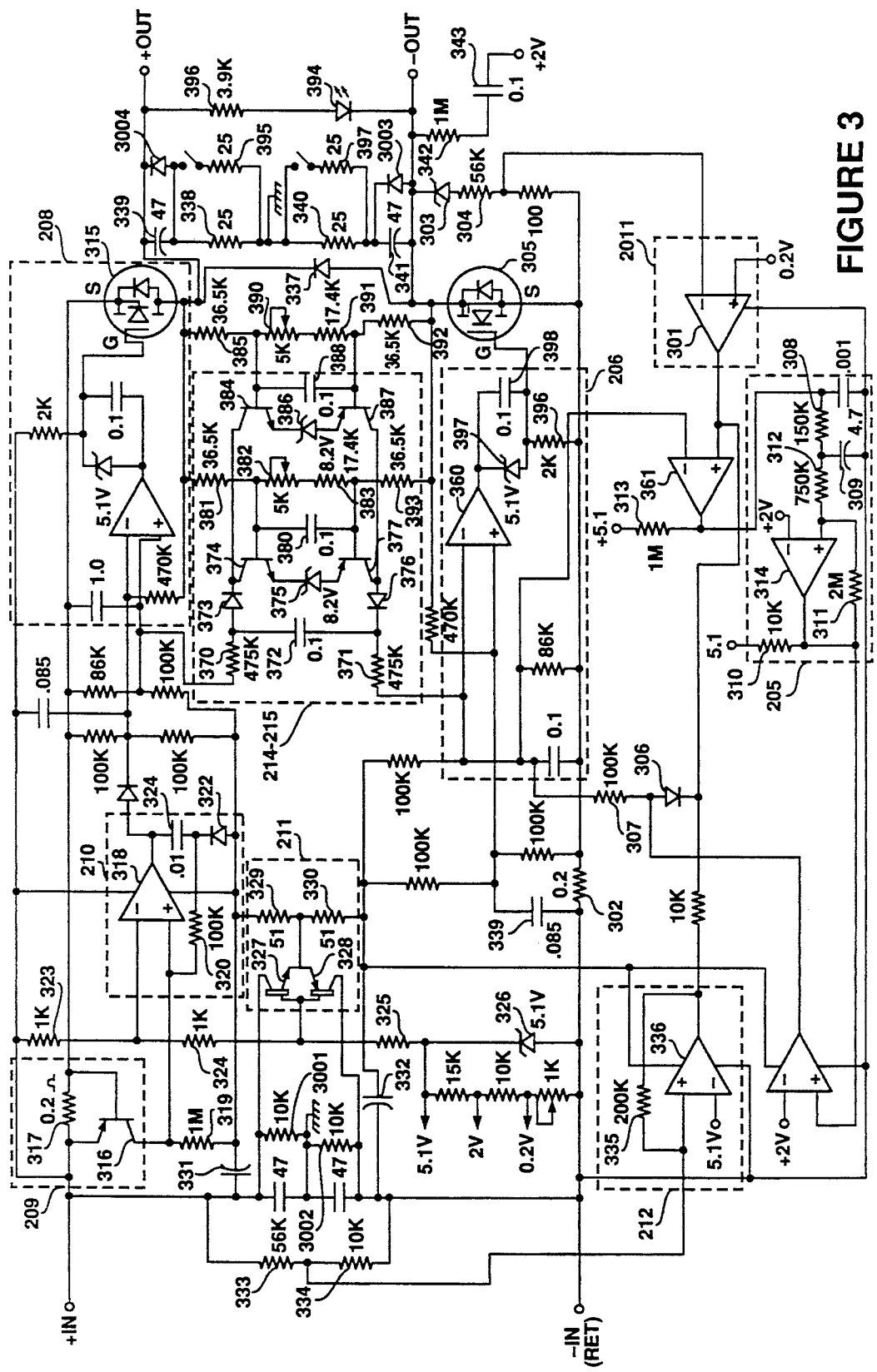
FIG. 3 is a detailed circuit diagram of the currently preferred embodiment of the source power coupler of the present invention.

FIG. 3 is a detailed circuit diagram of the currently preferred embodiment of the source power coupler. It can be seen that the lower overcurrent detector is comprised of an open collector voltage comparator 301, which detects a one ampere current limit point by sensing a 0.2 volt drop across resistor 302. The 10 V zener diode 303 and resistor 304 provide foldback current limiting which minimizes the power dissipation in transistor 305. Furthermore, comparator 301 draws current through diode 306 and resistor 307 to minimize the current flowing through the lower source power isolator. This current limit action continues until the lower delay timer times out as determined by the RC time constant of resistor 308 and capacitor 309. Afterwards, the lower stop timer comprised of capacitor 309 and resistors 308 and 310–313 is activated and completely turns off the lower source power isolator for approximately seven seconds. This produces a 10% duty cycle and also limits the power dissipation in transistor 305 to a non-destructive value.

The upper overcurrent detector is set to detect currents above three amperes. It is comprised of transistor 316 and resistor 317. The current limit signal activates the upper stop timer comprised of op-amp 318, resistors 319 and 320, capacitor 324, and diode 322.

The active supply divider is comprised of zener diode 326, transistors 327–328, and resistors 323–325 and 329–330. Noise filtering is provided by resistor 329 and capacitor 331. Additional filtering is provided by resistor 330 and capacitor 332. These filters minimize the internal power supply bus noise and enhances the common mode power supply rejection capability to improve the high frequency impedance of the upper and lower source power isolators.

It can be seen that the input undervoltage lockout and hysteresis function is implemented by resistors 333–335 and op-amp 336. This prevents the source power coupler from operating when the input voltage is less than approximately thirty volts. Hence, sufficient voltage is supplied to the various circuits, while preventing loss of control which might damage source power isolator transistors 305 and 315 from excessive power dissipation. Furthermore, the diode 337 is used to provide reverse voltage protection to protect transistors 305 and 315 against accidental reversed connections to a transmission line, which would otherwise cause a voltage breakdown in those transistors.

In some instances, such as when there is a very small output load current, op-amp 360 may have difficulty controlling the gate of transistor 305. Hence, diode 397 is implemented to provide a voltage offset which is set by zener diode 397. The voltage of zener diode 397 is chosen such that op-amp 360 remains able to control transistor 305 all the way down to no load. Capacitor 398 is used to reduce the broadband noise of zener diode 397, as well as reduce the impedance at high frequencies between the output of op-amp 360 and the gate input of transistor 305.

Referring to FIG. 3, it can be seen that the resistors 338 and 340 and the capacitors 339 and 341 provide a constant differential termination impedance over the usable signal frequency range. Note that the common mode (i.e., the output lines to earth ground) impedance is low because resistors 338 and 340 are in parallel. This 12.5 ohm common mode impedance helps prevent common mode noise currents from reducing the voltage across transistors 305 and 315. If the voltage across transistors 305 and 315 becomes too small, the impedance across them will diminish and limit the AC signal on that transmission line.

In applications where two or more source power couplers are used together, the synchronization function for ensuring that both source power couplers power up the transmission line at the same time, is provided by resistor 342 and capacitor 343. When one source power isolator turns on, the voltage on the negative output line of the other source power coupler falls and couples an AC signal through resistor 342 and capacitor 343 onto the two volt internal bus. In turn, this reduces the threshold voltage at comparator 314, thereby permitting an earlier, synchronized turn on of the source power coupler.

In order to ensure that no more than 42.4 volts DC is ever applied across the transmission line, a single fault tolerant circuit to sense the output DC voltage and to provide a current signal to the upper and lower source power isolators is provided to limit the output voltage. The circuit consists of two parallel, identical voltage sense circuits for redundancy, each with an adjustment for a precision output voltage limit setting. It also includes a pair of protection/rectification diodes and a low-pass RC filter circuit. In the event any component in the entire source power coupler is either shorted or opened (i.e., single point failure), resulting in a potential output overvoltage condition, the feedback signal from the $V_{out}$ limiter will maintain control of either or tooth of the upper and lower source power isolators so as to prevent the output differential voltage from exceeding 42.4 volts, a requirement by some safety agency specifications. The voltage limit setting remains stable with variations in ambient temperature and is not affected by data rate signals superimposed on the output DC voltage.

In FIG. 3, a voltage divider, resistors 381-383 and 393 are coupled from the source power coupler output (i.e., +OUT and −OUT) to the bases of NPN transistor 374 and PNP transistor 373. The emitters of these transistors are connected via series zener diode 375. With proper adjustment of resistor 382, the voltage divider can be set to cause the transistors to turn on when the output voltage +OUT to −OUT approaches 42.4 volts. When the resulting voltage across the series zener diode causes it to conduct, current into the collector of NPN transistor 374 from the upper source power isolator via diode 373 and resistor 370 flows through the zener diode and out of the collector of PNP transistor 377 to the lower source power isolator via diode 376 and resistor 371.

The negative temperature coefficients of the NPN and PNP transistors are canceled by the positive temperature coefficient of the 8.2 volt zener diode, thereby rendering the overvoltage setting stable with respect to temperature. Since the overvoltage current signal under normal operation from/to the upper/lower source power isolators respectively is identical, both source power isolators respond to the overvoltage condition symmetrically. The redundant portion of the $V_{out}$ limit circuit is formed by elements 385, 390-392,384, and 386-388. This results in symmetric voltage drops across the upper and lower source power isolators and prevents the output voltage from exceeding 42.4 VDC.

Capacitor 380 in conjunction with resistors 381-383 and 393 filter out data rate frequencies from the sampled voltage divider signal to prevent rectification by the NPN and PNP transistors. Otherwise, the output voltage would be reduced when data rate signals are present. Capacitor 372 in conjunction with resistors 370 and 371 form a low pass filter of the voltage limit feedback signal to prevent it from otherwise reducing the AC impedance presented by the source power isolators.

In the present invention, any single point failure will not cause the output voltage to exceed 42.4 volts. At worst case, either the upper source power isolator and transistor 349 or the lower source power isolator and transistor 348 will remain functional. In either case, the output voltage is limited.

Resistor 393 and light emitting diode (LED) 394 serve to indicate the active power on state of the source power coupler. When the power is ON, +OUT is 42 volts with respect to −OUT. A current flows through resistor 393 and through forward biased diode 394, causing LED 394 to emit light. This indicates that the source power coupler is ON and that it can provide network power. LED 394 does not emit light when the source power coupler is turned OFF.

Furthermore, two resistors 3001 and 3002 are implemented to automatically center the output of a floating source power supply with respect to earth ground. Resistor 3001 is a 10K ohm resistor coupled from the collector of transistor 327 to ground. Resistor 3002 is a 10K ohm resistor coupled from capacitor 332 to ground. Hence, if Vout is desired to be 42 volts, then +OUT is +21 volts and −OUT is −21 volts with respect to earth ground.

A diode 3003 is coupled across the polarized output termination capacitor 341. Similarly, diode 3004 is coupled across the polarized output termination capacitor 339. These two diodes 3003-3004 are used to protect the capacitors 341 and 339 in case they become reverse polarized.

Figure 4:
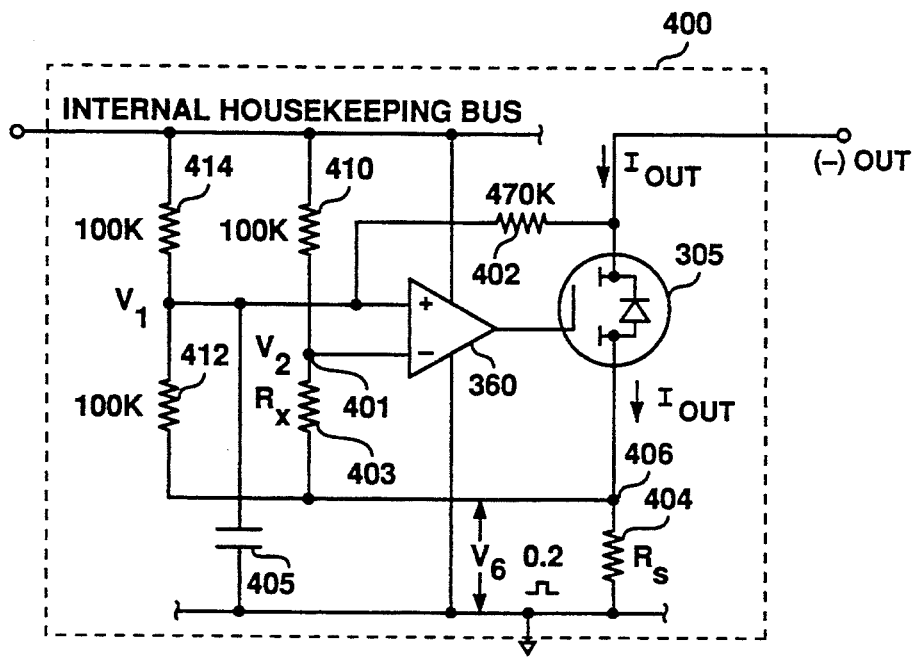
FIG. 4 is a detailed circuit diagram of the lower source power isolator and the relevant components for establishing the DC operating point.

FIG. 4 is a circuit diagram of the lower source power isolator and the relevant components for establishing the DC operating point. Given that the internal housekeeping bus is at 24 volts, the following calculations are used to determine the value for $R_x$ in order to develop a three volt DC drop across transistor 305:

$$V_1 \cong V_2$$

$$V_2 = (24)[R_x/(R_x + 100K)]$$

$$I_{(node\ 401)} = O = \{[(24 - V_1)/100K] - [V_1/100K] - [(V_1 - 3V)/470K]\}$$

$$V_1 = 11.135V = V_2$$

$$11.135V = 24[R_x/(R_x + 100K)]$$

$$R_x = 86.6K ohm$$

The source power isolator 400, having an impedance Z(f) as a function of frequency, is comprised of op-amp 360, transistor 305, resistors 402-403 and 410-412, and capacitor 405. The output of op-amp 360 is coupled to the gate of transistor 305. The drain of transistor 305 is coupled to the negative output transmission line, and the source of transistor 305 is coupled to a sense resistor 404. The other end of sense resistor 404 is coupled to either ground or the power source. The inverting input of op-amp 360 is coupled to the junction 406 of the source of transistor and sense resistor 404. This forms a control loop to provide a high AC impedance between the power source and the transmission line. Hence, the lower source power isolator has an impedance Z(f) which is a function of frequency.

The non-inverting input of op-amp 360 is coupled to a voltage feedback resistor 402 and a capacitor 405. The other end of feedback resistor 402 is coupled to the transmission line, while the other end of capacitor 405 is coupled to the power source. This forms a constant DC voltage control loop, which maintains a nearly constant DC voltage across transistor 305. The offset voltage developed because resistor 403 is not 100K ohms as are resistors 410-412 provides an offset voltage between either the inverting or non-inverting input of op-amp 360. This sets the quiescent DC voltage across the transistor 305.

The upper source power isolator is comprised of the same components as the lower source power isolator as described in detail above. It should be noted that transistors 305 and 315 can be either field effect transistors or bipolar transistors. For bipolar transistor embodiments, the gate corresponds to the base; the drain corresponds to the collector; and the source corresponds to the emitter.

Figure 5:
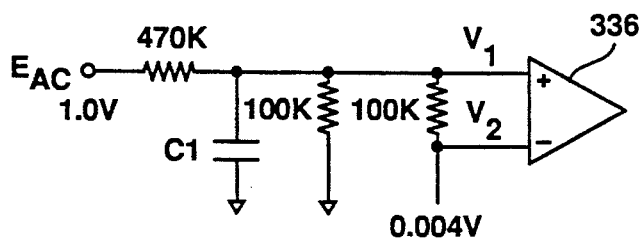
FIG. 5 is a detailed circuit diagram of the lower source power isolator and the relevant components for establishing the AC operating point.

FIG. 5 is a circuit diagram of the lower source power isolator and the relevant components for establishing the AC impedance. In the present invention, the value of $C_1$ is calculated to achieve a relatively high AC impedance (e.g., $Z_{AC}=X_L=50$ ohms). This prevents excessive loading of the transmission line to ground at the lowest data frequency (e.g., 1.0 KHz). The value of C1 is calculated as follows:

$V_1 \approx V_2$
$Z_{AC} = E_{AC}/I_{AC}$
Set $E_{AC} = 1.0$ volts
$I_{AC} = E_{AC}/Z_{AC} = 1/50 = 0.02$ amperes
$V_2 = I_{AC}R_s = 0.02 \, (0.2) = 0.004$ volts
$0.004$ volts $= 1.0$ volt $[X_{c1}/(X_{c1} + 470K)]$
$Xcl << 470K$
$0.004$ volts $= 1.0$ volt $(X_{c1}/470K)$
$X_{c1} = 1880$ ohms at 1.0 KHz
$C_1 = 1/(2\pi f X_{c1}) = 0.085$ microfarads Note that the effect of R2 is negligible because it is coupled across op-amp 360. Consequently, R2 has virtually zero volts across it.

It should also be noted that the upper source power isolator is essentially a mirror image of the lower source power isolator. Hence, it has identical corresponding components, and both of the source power isolators have nearly the same electrical performance.

Figure 6:
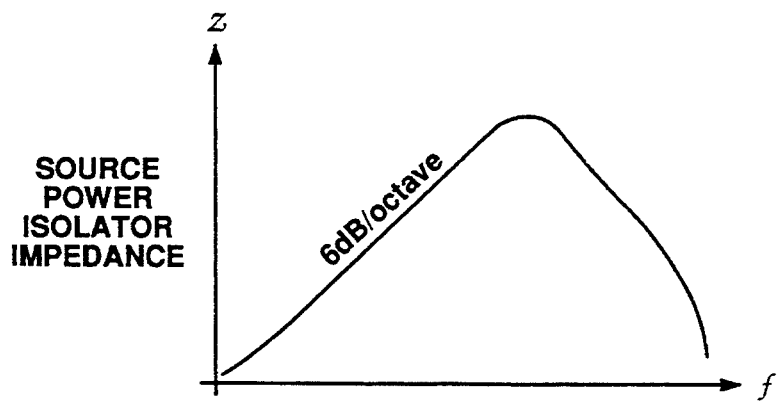
FIG. 6 is a plot showing the impedance of the lower and upper source power coupler as a function of frequency.

FIG. 6 is a plot showing the source power coupler's impedance as a function of frequency. It can be seen that the source power coupler's impedance increases at six decibels per octave of frequency until a maximum impedance is attained. At higher frequencies, the source power coupler's impedance starts to fall off. This happens because, the high-frequency gain for op-amps 318 and 360 and transistors 305 and 315 starts falling off at the higher frequencies, thereby resulting in a drop In the foregoing specification, the invention has been described with reference to specific exemplary embodiment thereof. It will, however, be evident that various modifications and changes may be made thereto without departing from the broader spirit and scope of the invention as set forth in the appended claims. The specification and drawings are, accordingly to be regarded in an illustrative rather than a restrictive sense.

Thus, a source power coupler is disclosed.

What is claimed is:

1. A source power coupler for coupling a power source to a first transmission line and a second transmission line, said first and said second transmission lines coupling a first processor to a second processor, wherein power is supplied to said first processor and said second processor by said first and said second transmission lines and data signals are conducted between said first processor and said second processor by said first and said second transmission lines, said source power coupler comprising:
   an operational amplifier having a non-inverting input and an inverting input;
   a transistor having a gate coupled to an output of said operational amplifier, a drain coupled to one of said first and said second transmission lines, and a source coupled to said inverting input of said operational amplifier, wherein a first control loop provides AC impedance between said power source and said one of said transmission lines;
   a capacitor coupling said non-inverting input of said operational amplifier and said power source;
   a resistor coupling said non-inverting input of said operational amplifier and said one of said transmission lines, wherein said capacitor and said resistor provide a second control loop for maintaining an approximately constant DC voltage across said transistor.

2. The source power coupler of claim 1 further comprising a regulating means coupled to said operational amplifier for regulating an output voltage of said source power coupler approximately equal to but not exceeding a pre-determined voltage.

3. The source power coupler of claim 2, wherein said regulating means regulates said output voltage over load, temperature, and input voltage variations.

4. The source power coupler of claim 3, wherein said regulating means includes a potentiometer for adjusting said output voltage.

5. The source power coupler of claim 4, wherein said regulating means is symmetric.

6. The source power coupler of claim 5, wherein said regulating means is single fault failure tolerant.

7. The source power coupler of claim 1 further comprising a diode coupled across said first transmission line and said second transmission line for protection against reversed polarity.

8. The source power coupler of claim 1 further comprising a voltage limiter that is single fault tolerant.

9. The source power coupler of claim 1 further comprising a filter for providing input power supply noise rejection.

10. The source power coupler of claim 1 further comprising an active supply divider.

11. The source power coupler of claim 1 further comprising a means for providing an output current bias during low DC current loading.

12. The source power coupler of claim 1 further comprising a light emitting diode for indicating whether said source power coupler is operating.

13. The source power coupler of claim 1 further comprising a means for selectably changing an output impedance of said source power coupler, wherein at least two source power couplers can be coupled together in parallel.

14. The source power coupler of claim 1 further comprising a means for centering an output voltage with respect to earth ground.

15. The source power coupler of claim 1 further comprising a diode coupled across a polarized output termination capacitor.

16. The source power coupler of claim 1 further comprising two RC filters coupled in series across said first transmission line and said second transmission line.

17. A solid state source power coupler for coupling a power source to a first transmission line and a second transmission line, wherein direct current power from said power source is conducted by said source power coupler to said first and said second transmission lines while alternating current on said first and said second transmission lines is isolated from said power source by said source power coupler, wherein said source power coupler comprises:
   an operational amplifier having a non-inverting input and an inverting input;
   a transistor having a gate coupled to an output of said operational amplifier, a drain coupled to the other of said first and said second transmission lines, and a source coupled to said inverting input of said operational amplifier, wherein a first control loop provides an AC impedance between said power source and said other one of said transmission lines;
   a first resistor coupled between said source of said transistor and said power source;
   a capacitor coupled between said non-inverting input of said operational amplifier and said power source;

a second resistor coupled between said non-inverting input of said operational amplifier and said other one of said transmission lines, wherein said capacitor and said second resistor provide a second control loop for maintaining an approximately constant DC voltage across said transistor.

18. The solid state source power coupler of claim 17 further comprising a regulating means coupled to said operational amplifier for regulating an output voltage of said solid state source power coupler approximately equal to but not exceeding a predetermined voltage.

19. The solid state source power coupler of claim 18, wherein said regulating means regulates said output voltage over load, temperature, and input voltage variations.

20. The solid state source power coupler of claim 19, wherein said regulating means includes a potentiometer for adjusting said output voltage.

21. The solid state source power coupler of claim 20, wherein said regulating means is symmetric in relation to said first transmission line and said second transmission line.

22. The solid state source power coupler of claim 21, wherein said regulating means is single fault failure tolerant.

23. The solid state source power coupler of claim 22 further comprising a diode coupled between said first transmission line and said second transmission line for protection against reversed polarity.

24. The solid state source power coupler of claim 23 further comprising a voltage limiting means for limiting an output voltage, wherein said voltage limiting means is single fault tolerant.

25. The solid state source power coupler of claim 24 further comprising a filter for filtering power from said power source.

26. The solid state source power coupler of claim 25 further comprising an active supply divider.

27. The solid state source power coupler of claim 26 further comprising a means for providing an output current bias during low DC current loading.

28. The solid state source power coupler of claim 27 further comprising a light emitting diode for indicating whether said solid state source power coupler is in operation.

29. The solid state source power coupler of claim 28 further comprising a means for changing an output impedance of said solid state source power coupler for coupling at least two solid state source power couplers together in parallel.

30. The solid state source power coupler of claim 29 further comprising a means for centering an output voltage with respect to earth ground.

31. The solid state source power coupler of claim 30 further comprising a diode coupled across a polarized output termination capacitor.

32. The solid state source power coupler of claim 31 further comprising two RC filters coupled across said first and said second transmission lines.

* * * * *